May 30, 1950
R. O. ISENBARGER
2,509,436
PACKING
Filed July 12, 1947
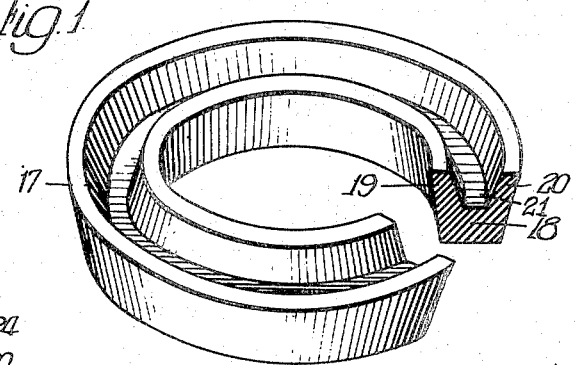
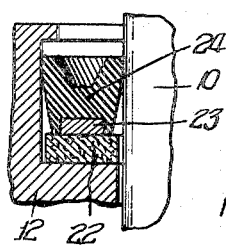
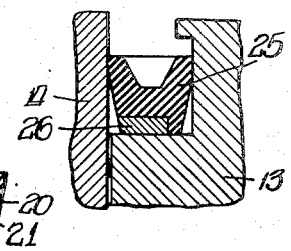
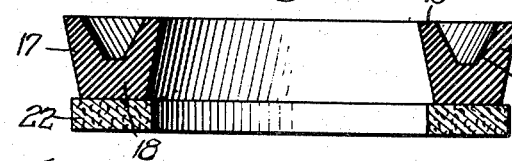
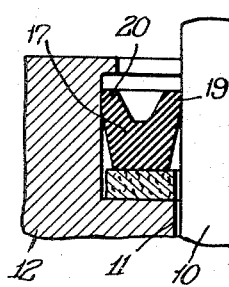
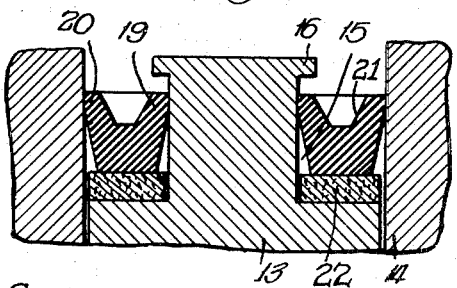
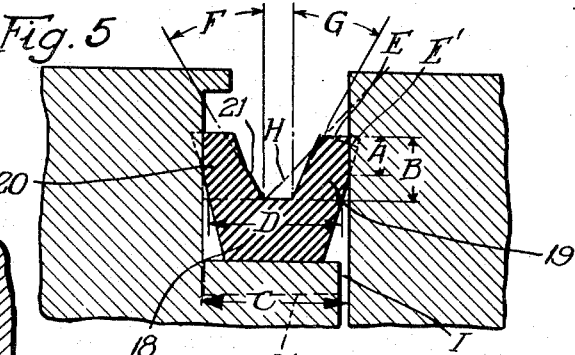
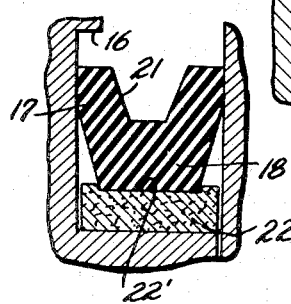
INVENTOR.
Robert O. Isenbarger,
BY
Cromwell, Greist & Warden
ATTYS.

UNITED STATES PATENT OFFICE 2,509,436

PACKING

Robert O. Isenbarger, Chicago, Ill., assignor to Chicago Rawhide Manufacturing Company, Chicago, Ill., a corporation of Illinois Application July 12, 1947, Serial No. 760,603

4 Claims. (Cl. 286—26)

This invention pertains to an improved packing assembly adapted to seal a pair of relatively movable parts against loss of pressure or fluid leakage therebetween.

It is an object of the invention to provide an improved assembly of the type described, including a resilient, block-type annular packing of V-shaped cross section, mounted in association with a pair of coacting, and usually relatively reciprocable, parts in an annular groove in one thereof, which member is characterized by axially divergent sealing lips so proportioned in relation to the remainder of the member that lip flexure takes place exclusively in the sealing of the parts, as distinguished from compression of the body of the packing.

A further object is to provide a block-type packing member of V-shaped radial cross section, of which the component parts are so proportioned and installed in sealing relation to a pair of coacting or relatively movable members as to seal the members against pressure loss or leakage with a minimum of friction, also without likelihood of taking on a permanent set, and in a manner to compensate automatically for eccentricity or misalignment of the aforesaid members.

Yet another object is to provide a packing or sealing assembly which is equally effective in providing an efficient shaft packing, in which a relatively movable shaft or like part is sealed at the inner periphery of an annular packing member, or a cylinder seal in which sealing takes place at a cylinder surface on the outer periphery of the member.

More specifically, it is an object to provide a packing assembly of the type described above including an improved resilient or flexible packing member of block V-shaped cross section, associated with one of a pair of relatively movable or reciprocable parts for axial floating movement in said recess, thereby enabling said member to adjust itself under pressure and hence avoid distortion due to cramping.

A still further object is to provide a packing assembly of the type described, including an annular packing member of V-shaped cross section provided with axially extending, mutually divergent lips tapered and beveled on the respective side surfaces thereof in a manner to produce most effective shaft or cylinder sealing operation with a minimum of friction.

Yet another object is to provide, in an assembly of the type described above, a yieldable or compressible cushioning washer adapted to coact with the packing member in a manner to insure against extrusion of the material of the packing member in operation and thereby lengthening the life of the latter.

The foregoing statements are indicative in a general way of the nature of the invention, but other and more specific objects will be apparent to those skilled in the art upon a full understanding of the construction and operation of the device.

Various applications of the invention are presented herein for purpose of exemplification, and it will be appreciated that the invention is susceptible of incorporation in other modified forms coming equally within the scope of the appended claims.

In the drawings,

Fig. 1 is a top perspective view, partially broken away and in transverse radial section, illustrating the annular packing or sealing member constituting the basic component of the improved assembly;

Fig. 2 is a view in transverse vertical section illustrating the assembly of the packing member of Fig. 1 with a yieldable protective cushion member which is preferably associated therewith in accordance with the invention;

Figs. 3 and 4 are similar fragmentary views in transverse section showing alternative adaptations or applications of the assembly, Fig. 3 indicating the manner of embodying the invention in an internal shaft seal, and Fig. 4 showing the arrangement of parts for an external cylinder seal;

Fig. 5 is a fragmentary view in transverse section which schematically illustrates certain of the dimensional relationships involved in the packing assembly, more specifically the relationship of the elements of the packing in an annular groove in one of two parts with which the packing coacts;

Figs 6 and 7 are fragmentary views in vertical section through two somewhat modified embodiments of the packing which are contemplated by the invention; and Fig. 8 is a fragmentary view illustrating the condition of the parts following operation of an installation embodying a fibrous washer in conjunction with the special packing of the invention.

This invention relates to an improved pressure packing which is particularly devised for use in association with a pair of relatively reciprocable parts to seal the same against leakage or loss of pressure of various fluid media, such as oil, water, air, etc., whether under pressure or not. However, the packing likewise has utility in the sealing of relatively rotatable parts, and even in static application to parts between which no relative movement occurs. The assembly is characterized primarily by the advantages that frictional loss is reduced to a minimum, notwithstanding a very effective packing or sealing action; that permanent set of the packing member, and resultant loss of efficiency is impossible; and that automatic self alignment and uniform engagement of the packing with the surfaces to be sealed is insured. These features are attributable largely to the shape and special proportioning of the integral component elements of the one-piece packing member with relation to the coacting sealed parts, as hereinafter described in detail.

Referring to the drawings, and in particular to Figs. 3 and 4, wherein two alternative methods of installing the assembly are illustrated, the reference numeral 10 in Fig. 3 designates a shaft which may be considered to reciprocate or rotate in a bore 11 in a relatively fixed part such as housing 12, whereas in Fig. 4 the reference numeral 13 designates a piston or plunger reciprocable in a cylinder or bore 14. The provisions of the invention are equally applicable in either of the installations shown in Figs. 3 and 4.

As illustrated in Fig. 3, the housing 12, is provided with an annular recess 15 to accommodate the packing member of the assembly, said recess being arranged internally of the housing and concentric with shaft receiving bore 11. Recess 15 is shown as undercut to afford an annular end abutment or shoulder 16 adjacent its exposed outer end. In the cylinder sealing adaptation of Fig. 4 the recess 15 takes the form of an external groove on the plunger, likewise undercut to afford the annular end abutment or shoulder 16 on the end of the plunger. As will be apparent the abutment 16, in either case, might be formed by a separate ring or plate secured on the housing 12 or plunger 13 respectively, but an integral construction has been shown for simplicity of illustration. The radial extent of abutment 16 is susceptible of variation as circumstances dictate, provided only that it radially overhang recess 15 sufficiently to axially restrain the packing member 17 disposed in said recess.

Packing member 17 is of a block-like generally V-shaped, radial cross section, including a main or body portion 18 of substantial axial depth and radial side thickness, provided at each radial side thereof with integral, radially and axially upwardly divergent inner and outer lips 19, 20, respectively, separated by the V-shaped annular groove 21, each of said lips being of substantial radial thickness. The member 17 may be fabricated of molded synthetic or natural rubber or comparable resilient material or composition, or of leather, flexible fiber and the like.

The lips 19, 20 extend axially in the direction of the fluid to be sealed. They have sealing engagement respectively with the shaft 10 and the wall of the internal housing recess 15, in the installation shown in Fig. 3, and with the inner wall of the plunger recess 15 and the surface of cylinder 14, respectively, in the form illustrated in Fig. 4. As stated above, abutment 16 projects radially and normally in axially spaced relation to the free edges of lips 19, 20 for limiting engagement with one thereof in the operation of the assembly, since packing member 17 is capable of axial floating relative movement in the recess 15 during such operation. This lack of axial confinement is an important feature of the assembly, in a preferred form.

The assembly is ordinarily completed by an annular, compressible cushioning washer 22 interposed between the body 18 of the packing 17 and the adjacent axial wall of the groove 15. Said washer may be fabricated of any desirable flexible and compressible material, preferably fibrous in nature, such as leather.

Particular details of the outline and proportioning of the packing member 17 relative to recess 15 are of significance and are illustrated clearly in Fig. 5. This is a schematic or diagrammatic view of the illustration, which shows in dotted lines the position of the lips 19, 20 in their original relaxed and unflexed condition, and in solid lines the position assumed by said lips when operatively installed. It will be noted that the point of zero interference, i. e., the axial point on packing 17 at which the lips 19, 20 leave contact with the coacting surfaces of the relatively reciprocable members 10 or 14, is spaced substantially above the bottom of the annular V-shaped groove 21 which separates those lips, i. e., the point at which "solid" compression would occur. In other words, the dimension A represented in Fig. 5 must be less than the dimension B and dimension C must be greater than dimension D. This insures a purely flexing action of the lips in operation as the parts reciprocate relative to one another, as distinguished from a compression of the body 18 of the packing. As a result, friction and abrasion of the packing are reduced; and since, for a given amount of resilient deflection the fiber stress involved in lip flexing is less than in material compression, there is much less tendency toward material flow and consequent permanent set. It will therefore, be appreciated that the packing is enabled to take up eccentricity or radial shifting movement between the parts sealed in very ready and unfailing manner, without loss of sealing contact, due to elimination of this tendency. Similarly, repeated assembly and dis-assembly are made possible, without any loss of effectiveness in sealing. The advantage of decreased friction due to decreased radial force is obvious.

The tapered external outline of the lips, merging in a straight line into the body 18, provides for contact only adjacent the top of the lip, in addition to reducing the frictional contact area, and allows for some elastic deformation at this point (see Fig. 5) under low pressure, without causing contact in the area below groove 21. The axially uppermost surface or free edge of each lip, designated E, being of substantial radial width, affords sufficient material at this point to prevent turning under or stubbing against the rubbing surface upon reciprocation. A sharp edge at this point would tend to turn under, with resultant loss of seal.

Concerning the angle between the inner and outer bevels of the sealing lips 19, 20, said angles being designated F and G, respectively, in Fig. 5, this is determined in accordance with the pressure involved in the installation. As illustrated it is about 30 degrees. In any given installation it is, of course, necessary to seal effectively at both minimum and maximum pressures and the bevel is determined by the maximum pressure, care being taken that sealing also takes place at minimum pressure by the lip flexing resiliency of the packing. It is desirable to increase the angle of internal bevel when higher pressures are handled, as indicated in broken line and designated by the reference character H, thereby offsetting the tendency to contact the coacting sealing surface farther down on the lip. In short, bevel H is so controlled that the component of pressure toward the moving surface is only sufficient to effect sealing while keeping friction to a minimum. In this connection, the relatively wide, buttress shape of free edge E between the inner bevel and outer taper tends to create a greater force of contact at the top or edge E of the lip, where it is needed for sealing, this force decreasing away from this point. In cases where an extremely light frictional engagement is desired this surface may be given a slight outward and rearward taper as indicated in dotted lines in Fig. 5 and designated E'.

From the above considerations it follows that the surfaces which the sealing lips movably contact need not be extremely smooth and, well finished, as would otherwise be necessary, inasmuch as the anti-friction characteristic of the structure described greatly reduces the normal tendency of the packing to abrade or bond to the surface.

As mentioned above, it is desirable that the packing 17 be employed in association with the compressible cushioning washer 22. The latter is preferably made of a flexible fibrous material such as leather or other appropriate fibrous material or composition which will compress in the axial direction without radial extrusion. The fiber grain is arranged to run parallel to the faces of the washer, so that the latter will compress axially as desired without increasing its radial dimensions in a material degree. Such axial compression will occur only at the area of contact at the base of the packing 17, the portions of the washer not compressed on either radial side of said area tending to bulge axially and fill up the free space immediately thereabove. Thus the normal tendency of the body 18 of packing 17 to extrude into this space is inhibited. As illustrated in Fig. 8, the seat 22' which is formed in washer 22 as the result of compression thereof serves to confine the lower peripheral corners of the annular packing base or body 8, this being the zone at which the tendency to extrude is most pronounced. Washer wear is also eliminated or reduced to a minimum. Moreover, due to the action of the washer in combatting the tendency of packing body 18 to extrude into the annular space between the relatively annular movable parts, denoted I in Fig. 5, the tolerance at this space may be relaxed and greater eccentricity accommodated.

It has been found that when the packing member 17 is not quite centered radially in the space between the packing engaging wall of the packing groove of members 12 or 13 and the radially opposed surface of the member which is sealed, due either to inaccuracies in the diameter of the packing or of its confining members, said member 17 nevertheless becomes centered under pressure. The present packing is therefore self-positioning in the radial direction.

In any installation I prefer that packing 17 be free to float axially with little friction in the annular recess 15 in which it is carried. This renders the packing self-adjusting and self-aligning under pressure, without clamping distortion regardless of variations in tolerance and eccentricity between the parts. Needless to say, this advantage would be severely restricted lacking the anti-friction and anti-set characteristics discussed at length above.

In Figs. 6 and 7 I illustrate slightly modified embodiments of the above described packing structure. It is desirable in some cases to mold a heavy flat steel washer or ring 23 into the body or base of the packing in the manner illustrated in Fig. 6, wherein the packing is designated 24 in Fig. 6. In other respects, packing 24 is similar to the packing 17.

The ring 23 is molded concentrically in the packing and centrally of the base of the latter in the radial sense. A fiber washer similar to the washers 22 of Figs. 2, 3 and 4 is shown as employed in supporting relation to the steel reinforced packing 24; however, it may not be necessary in some cases to employ this additional washer.

A still further modified form of the packing is illustrated in Fig. 7, being designated by the reference numeral 25. In this form steel reinforcing ring 26 is molded in the base of the ring adjacent the lower outer periphery thereof, rather than centrally of the radial dimension of the packing, as in Fig. 6. Being integrally joined to the material of the packing, the ring 26, when positioned in this fashion, serves to inhibit any tendency of the compressible packing material to extrude into the space between the member 13 and the member 14 sealingly engaged thereby. For this reason the reinforced packing 25 is shown in its groove without the fibrous washer which appears in Figs. 2, 3, 4 and 6. However, it will be appreciated that this fiber washer may be dispensed with in all forms of the invention or, if circumstances dictate, may be employed in conjunction with any of the embodiments. It will likewise be appreciated that the modifications in Figs. 6 and 7 are entirely interchangeable as regards their employment in association with a shaft 10 and housing 12, as in Fig. 6, or with a plunger 13 and bore 14 as in Fig. 7.

Those skilled in the art will perceive the possibility of various alterations and modifications of the structure described. Hence, I desire that the invention be construed no more limitedly than reasonably indicated by the scope of the appended claims.

I claim:

1. A sealing structure for a pair of concentric, axially telescoped parts comprising a flexible packing ring of block-like, V-shaped cross section in an axially extending plane, said ring including a body portion of substantial radial and axial thickness and inner and outer annular lips of substantial radial thickness which are integral with and diverge from the respective inner and outer radial sides of said body portion, and a generally flat cushioning ring of compressible material adapted to be supported on one axial side thereof by one of said axially telescoped parts, said cushioning ring being engaged by and axially supporting the body portion of said packing ring, said cushioning ring radially overlapping and extending beyond the radial margin of said packing member body portion adjacent the other of said axially telescoped parts and being compressed and indented by said body portion to radially confine the material of the latter at said margin.

2. A sealing structure for a pair of concentric, axially telescoped parts comprising a flexible packing ring of block-like, V-shaped cross section in an axially extending plane, said ring including a body portion of substantial radial and axial thickness and inner and outer annular lips of substantial radial thickness which are integral with and diverge from the respective inner and outer radial sides of said body portion, and a generally flat cushioning ring of compressible material adapted to be supported on one axial side thereof by one of said axially telescoped parts, said cushioning ring being engaged by and axially supporting the body portion of said packing ring, said cushioning ring radially overlapping and extending beyond both radial margins of said packing member body portion and being compressed and indented by the latter to radially confine the material of the latter at said margins.

3. In combination with a pair of concentric, axially telescoped parts to be sealed against axial leakage therebetween, one of which has an annular recess concentric with the axis thereof, a flexible, annular packing member of block-like, V-shaped radial cross section disposed concentrically in said recess, said member having a body portion of substantial radial and axial thickness and inner and outer annular lips of substantial radial thickness integral with and diverging radially and axially from the body portion at the respective inner and outer radial sides thereof, said lips being spaced radially by an annular, axially opening channel, and an annular, generally flat, axially compressible supporting and cushioning ring for the packing member interposed between the body portion thereof and an axial wall of said recess remote from said lips, said last named ring extending radially beyond and overlapping the radial margin of said packing member body portion adjacent the other of said axially telescoped parts and being compressed and indented by the latter to radially confine the material of said body portion at said margin.

4. In combination with a pair of concentric, axially telescoped parts to be sealed against axial leakage therebetween, one of which has an annular recess concentric with the axis thereof, a flexible, annular packing member of block-like, V-shaped radial cross section disposed concentrically in said recess, said member having a body portion of substantial radial and axial thickness and inner and outer annular lips of substantial radial thickness integral with and diverging radially and axially from the body portion at the respective inner and outer radial sides thereof, said lips terminating at free edges of substantial radial thickness, and being spaced radially by an annular, axially opening, V-shaped channel, said lips sealingly engaging the respective parts solely in the axial space between said free edges and the bottom of said channel to produce lip flexing action only in said member, and an annular, generally flat, axially compressible supporting and cushioning ring for said packing member interposed between the body portion thereof and an axial wall of said recess remote from said lips, said ring extending radially beyond and overlapping the radial margins of said packing member body portion and being compressed and indented by the latter to radially confine the material of said body portion at said margins, one of said parts to be sealed being provided with an abutment element in axially spaced relation to one of said free lip edges to enable predetermined axial movement of said packing member in said recess while engaging said edge to limit said movement.

ROBERT O. ISENBARGER.

REFERENCES CITED

The following references are of record in the file of this patent:

UNITED STATES PATENTS

| Number | Name | Date |
|---|---|---|
| 549,419 | Wright | Nov. 5, 1895 |
| 876,977 | Larson | Jan. 21, 1908 |
| 1,651,131 | Joyce | Nov. 29, 1927 |
| 2,387,182 | Proctor | Oct. 16, 1945 |

FOREIGN PATENTS

| Number | Country | Date |
|---|---|---|
| 544,732 | Great Britain | of 1942 |
| 544,904 | Great Britain | of 1942 |
| 560,515 | Great Britain | of 1944 |